(12) United States Patent
Matscheko et al.

(10) Patent No.: US 9,150,116 B2
(45) Date of Patent: Oct. 6, 2015

(54) CONVEYOR SYSTEM COMPRISING AN ELECTROMAGNETIC BRAKE

(75) Inventors: Gerhard Matscheko, Starnberg (DE); Zeljko Jajtic, München (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 774 days.

(21) Appl. No.: 13/500,777

(22) PCT Filed: Oct. 7, 2010

(86) PCT No.: PCT/EP2010/064978
§ 371 (c)(1),
(2), (4) Date: Apr. 6, 2012

(87) PCT Pub. No.: WO2011/042487
PCT Pub. Date: Apr. 14, 2011

(65) Prior Publication Data
US 2012/0193172 A1    Aug. 2, 2012

(30) Foreign Application Priority Data
Oct. 9, 2009    (DE) .......................... 10 2009 048 822

(51) Int. Cl.
*B66B 1/06*    (2006.01)
*B60L 13/03*    (2006.01)
*B60L 7/00*    (2006.01)
*B66B 11/04*   (2006.01)

(52) U.S. Cl.
CPC . *B60L 13/03* (2013.01); *B60L 7/00* (2013.01); *B66B 11/0407* (2013.01); *B60L 2200/26* (2013.01)

(58) Field of Classification Search
CPC .. B66B 9/02; B66B 11/0407; B66B 11/0415; B60L 13/03; B60L 7/00; B60L 2200/26; B60L 7/003
USPC ......... 187/247, 277, 289, 293, 406, 250, 251; 310/12.01, 12.09, 12.11, 12.15, 12.18; 318/135, 362, 375, 380
See application file for complete search history.

(56) References Cited

U.S. PATENT DOCUMENTS

| 3,863,574 | A | * | 2/1975 | Thomas ........................ 104/290 |
| 3,934,183 | A | * | 1/1976 | Saufferer ...................... 318/135 |
| 5,141,082 | A |   | 8/1992 | Ishii et al. |
| 5,203,432 | A | * | 4/1993 | Grinaski ....................... 187/251 |

(Continued)

FOREIGN PATENT DOCUMENTS

CN    1057240 A    12/1991
CN    1265078 A    8/2000

(Continued)

*Primary Examiner* — Anthony Salata
(74) *Attorney, Agent, or Firm* — Henry M. Feiereisen LLC

(57) ABSTRACT

A conveyor system has a transport device that can be moved along a substantially vertical path of travel and a linear motor having a primary part arranged on the transport device, and a secondary part arranged along the path of travel, the primary part has a primary winding and at least one permanent magnet, the secondary part has a profile in the direction of the path of travel with alternatingly arranged grooves and teeth, and a brake winding is arranged on the secondary part such that it can generate a braking force by interacting with the permanent magnet to brake the transport device for increasing operational safety.

3 Claims, 2 Drawing Sheets

(56) References Cited

U.S. PATENT DOCUMENTS

| | | | |
|---|---|---|---|
| 5,288,956 A * | 2/1994 | Kadokura et al. | 187/289 |
| 5,501,295 A * | 3/1996 | Muller et al. | 187/406 |
| 5,547,059 A * | 8/1996 | Watanabe et al. | 187/289 |
| 5,751,076 A * | 5/1998 | Zhou | 310/12.11 |
| 5,828,195 A * | 10/1998 | Zalesski | 318/366 |
| 6,305,501 B1 | 10/2001 | Kähkipuro et al. | |
| 7,261,186 B2 * | 8/2007 | Deplazes et al. | 187/277 |
| 7,573,162 B2 * | 8/2009 | Yura et al. | 310/12.21 |
| 7,834,489 B2 | 11/2010 | Matscheko et al. | |
| 7,863,782 B2 | 1/2011 | Matscheko et al. | |
| 2004/0070286 A1 * | 4/2004 | Marzano | 310/12 |
| 2004/0216960 A1 * | 11/2004 | Kocher et al. | 187/293 |
| 2007/0194632 A1 | 8/2007 | Yura et al. | |
| 2008/0190732 A1 | 8/2008 | Matscheko et al. | |
| 2009/0140583 A1 | 6/2009 | Jaitic et al. | |

FOREIGN PATENT DOCUMENTS

| | | |
|---|---|---|
| CN | 101186259 A | 5/2008 |
| DE | 34 22 374 | 12/1985 |
| DE | 10 2005 017 500 A1 | 10/2006 |
| DE | 10 2005 031 370 A1 | 2/2007 |
| DE | 10 2006 014 616 A1 | 10/2007 |
| EP | 0 785 162 A1 | 7/1997 |
| EP | 1 168 586 | 1/2002 |
| GB | 2 437 949 A | 11/2007 |
| JP | H0445088 A | 2/1992 |
| JP | H05302240 A | 11/1993 |
| JP | 2007228675 A | 9/2007 |
| JP | 2008127180 A | 6/2008 |
| WO | WO 98/58866 A2 | 12/1998 |
| WO | WO 03/064310 | 8/2003 |
| WO | WO 2007003601 A1 | 1/2007 |

* cited by examiner

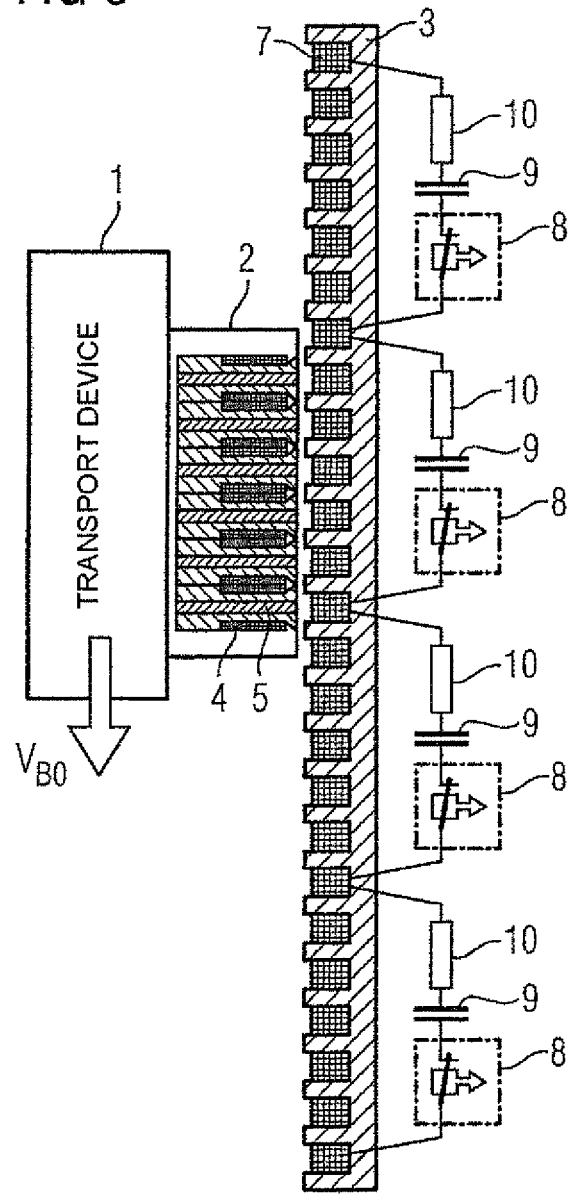

CONVEYOR SYSTEM COMPRISING AN ELECTROMAGNETIC BRAKE

CROSS-REFERENCES TO RELATED APPLICATIONS

This application is the U.S. National Stage of International Application No. PCT/2010/064978, filed Oct. 7, 2010, which designated the United States and has been published as International Publication No. WO 2011/042487 and which claims the priority of German Patent Application, Serial No. 10 2009 048 822.7, filed Oct. 9, 2009, pursuant to 35 U.S.C. 119(a)-(d).

BACKGROUND OF THE INVENTION

The present invention relates to a conveyor system.

Various conveyor systems by means of which passengers or goods can be transported from a first height level to a second height level are known from the prior art. Elevators or cranes have a purely vertical path of travel. Mountain railways such as e.g. cog railways, on the other hand, also cover a significant horizontal distance when overcoming a height difference. Both purely vertical paths of travel and paths of travel which have a finite gradient in order to overcome a height difference, but whose primary objective is to overcome said height difference, are classed in this application under the term 'substantially vertical path of travel'.

Most of the conveyor systems referred to are nowadays fitted with a rotationally operating electric motor and a cable traction system by means of which the rotational motion of the electric motor can be converted into a translational motion of the corresponding transport device. Such systems are relatively complicated to construct and bulky.

DE 10 2005 017 500 A1, on the other hand, discloses a passenger conveyor system comprising a synchronous linear motor. In order to make the design of such a passenger conveyor system simpler and cheaper, it is proposed here that, to drive it, the passenger conveyor system be equipped with a synchronous linear motor with a rack-and-pinion-type permanent-magnet-free secondary part, the primary part of the synchronous linear motor being fastened to the transport device, in or on which persons can be conveyed. The primary part comprises coils and permanent magnets for generating magnetic fields which interact with one another in order to drive the linear motor and thus the transport device. The secondary part is permanent-magnet-free and consequently highly resistant to soiling. A linear motor of this kind is for system-related reasons embodied as a short-stator motor, the term stator in a linear motor referring here and throughout the application to an element which can be supplied with an armature current, irrespective of whether the stator moves or stands still. A linear motor of this type is significantly cheaper than normal linear motors in which permanent magnets are arranged in the secondary part. This cost advantage is particularly noticeable in long paths of travel which require a secondary part of much greater length.

Due to the fact that the cable drives which are needed in rotational systems are not necessary in linear-motor-driven conveyor systems, there is inevitably also no need here for the operational and safety braking devices which are in part coupled to such cable drives.

The object of the invention is therefore to increase the operational safety of a conveyor system driven by means of a linear motor.

SUMMARY OF THE INVENTION

This object is achieved in a conveyor system which includes:

- a transport device that can be moved along a substantially vertical path of travel,
- a linear motor comprising a primary part arranged on said transport device and a secondary part arranged along the path of travel,
- the primary part having a primary winding and at least one permanent magnet and
- the secondary part having a profile in the direction of the path of travel comprising alternately arranged grooves and teeth, and
- a brake winding being arranged on the secondary part such that it can generate a braking force by interacting with the permanent magnets to brake said transport device.

Advantageous embodiments are described in the dependent claims.

The invention exploits the property of permanent-field motors of being able to develop a braking force without an external energy supply when a winding which is also present in these motors is short-circuited. In order to achieve the maximum possible electrical efficiency in normal operating mode, the windings of conventional permanent-field motors are designed such that the braking force generated by the winding short circuit reaches only c. ⅕ to ⅓ of the maximum thrust force of the motor. This applies both to rotationally operating motors and to the linear motors which are the prime focus here. This braking force is generally not sufficient in an economically designed drive system for a conveyor system, the transport device of which can be moved along a substantially vertical path of travel. This is particularly true of elevators, which have a purely vertical path of travel.

The secondary part of the linear motor which provides the drive within the inventive conveyor system has a rack-and-pinion-type profile. It is preferably of a permanent-magnet-free design and, to reduce iron losses, constructed from individual electrical sheets which are electrically insulated from one another. When the permanent-field primary part is moved, a magnetic alternating flux occurs in the secondary part.

This alternating flux also occurs when the conveyor system undergoes a total power failure, as the permanent magnets arranged in the primary part do not need any power supply to generate the exciter field. Such a power failure constitutes a malfunction in which the transport device has to be braked in order to prevent personal injury and/or damage to property. This braking is achieved according to the invention in that the brake windings are arranged on the secondary part such that, during a downward motion of the transport device caused by the unladen weight and the payload, the magnetic field of the permanent magnets induces a voltage in said brake winding. When the brake winding is electrically short-circuited or otherwise activated, this induced voltage generates a circular current ("eddy current") which counters the cause of the induced voltage, namely the downward motion of the transport device. A braking force is thus generated, as in an eddy-current brake, and this braking force is completely independent of the energy supply to the drive. The braking force required to prevent an uncontrolled descent of the transport device during a malfunction (e.g. power failure) is thus generated electromagnetically by the brake winding.

The brake winding arranged on the secondary part is an additional motor component which plays no part in driving the linear motor. Primary winding and permanent magnets can therefore be designed completely independently of the brake winding with a view to optimum motor operation, e.g. in terms of maximizing efficiency or minimizing the weight of the primary part.

In a preferred embodiment of the invention, the rack-and-pinion-type profile of the secondary part makes possible a very simple design in which the brake winding is arranged on at least some teeth of the secondary part in the form of individual or multiple serially connected tooth coils. The tooth coils can also be interconnected in a conventional manner, as in normal multiphase stator windings in a star or delta circuit, which can reduce the wiring required to connect the brake winding, particularly in a specific existing installation.

If the linear motor is not in braking mode, then the brake winding has to be operated in an open circuit so as not to generate any unwanted braking force. To switch over to braking mode, the conveyor system comprises in an advantageous embodiment of the invention a switch for switching the brake winding to a short circuit or for connecting the brake winding to a capacitor, a braking resistor being arranged in particular in parallel or in series with the capacitor. In this case, the switch is preferably to be configured such that, when the conveyor system is in a currentless state, the brake winding is short-circuited or is connected to the capacitor or to the series or parallel circuit comprising the capacitor and the braking resistor. This ensures that in the event of any malfunction the linear motor goes into "braking" operating mode. If, for example, the entire power supply to the conveyor system fails, the described configuration of the switch ensures that the braking effect of the short-circuited brake winding or of the brake winding connected to the capacitor or to the series or parallel circuit comprising the capacitor and the braking resistor is constantly present and that consequently the transport device does not descend in an uncontrolled manner due to its unladen weight and the payload.

Once the switch is closed in the event of a malfunction, the brake winding develops a velocity-dependent braking force. This follows a characteristic force-velocity curve which, through suitable dimensioning of the braking system, is preferably configured such that the transport device brakes in as controlled and smooth a manner as possible. For example, in order to achieve an optimum characteristic braking curve it may be advantageous to choose the capacitor such that, together with the inductance of the brake winding, it forms a resonance frequency at a desired velocity of the transport device. If the capacitor is chosen in such a preferred manner, the impedances of the brake winding and of the capacitor cancel each other out exactly at this velocity, so the AC impedance of the brake winding connected to the capacitor and the braking resistor is determined solely by the braking resistor. Under these operating conditions, the entire induced voltage drops at the braking resistor. A maximum amount of energy is thus converted into heat in the braking resistor.

The electromagnetic braking system according to the invention will exert an effect only when the primary part moves, as it is only when the primary part moves that an inductance effect is produced in the brake winding. Accordingly, the conveyor system is preferably designed with a buffer element for mechanically braking the transport device until it comes to a complete standstill, the buffer element being arranged at a lower end of the substantially vertical path of travel. In this advantageous embodiment of the invention, the transport device always comes to a standstill in the lowest end position of the path of travel. This is particularly advantageous, for example, in conveyor systems which are embodied as elevators, in particular as passenger elevators, as the passengers in this case can always exit at a defined point on the lowest floor. In passenger elevators known from the prior art, in the event of a malfunction the passenger car generally comes to a standstill at a random position in the shaft, so the passengers can exit only when the service personnel move the passenger car to an elevator door.

The electromagnetic brake according to the invention works in a passive, non-contact, reliable and wear- and maintenance-free manner and is consequently ideally suited to safety-related functions. The braking system preferably consists of only two highly robust and reliable hardware components, namely a stationary winding, the brake winding, and a short-circuit switch which in the currentless state is closed. The efficacy of such a braking system can also be checked and verified at any time automatically and without causing wear during routine operation of the elevator, for example when it is travelling empty.

BRIEF DESCRIPTION OF THE DRAWING

The invention will be described and explained in detail below with reference to the exemplary embodiments shown in the figures, in which:

FIG. 3 shows a schematic representation of a further elevator system designed according to a further embodiment of the invention.

DETAILED DESCRIPTION OF PREFERRED EMBODIMENTS

Figure 1:
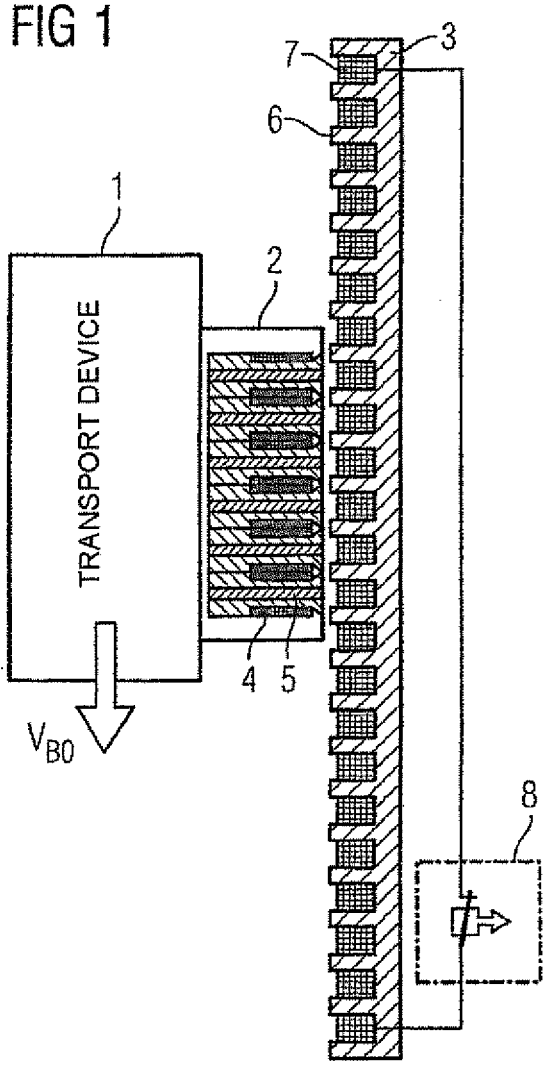
FIG. 1 shows a schematic representation of an elevator system designed according to an embodiment of the invention.

FIG. 1 shows a schematic representation of an elevator system designed according to an embodiment of the invention. This specific conveyor system comprises a transport device 1 which is embodied as a passenger-conveying car. A primary part 2 of a linear motor is arranged on this transport device 1. An associated secondary part 3 is located in an elevator shaft. The secondary part 3 is mounted along a path of travel which in this specific application is purely vertically oriented. The secondary part 3 has a rack-and-pinion design, in other words, viewed along the path of travel, teeth 6 and grooves alternate, with each of the latter being arranged between two teeth 6. The secondary part 3 is constructed of individual electrical sheets which are electrically insulated from one another so as to keep iron losses in the secondary part 3 as low as possible. The secondary part 3 is, in addition, of a completely permanent-magnet-free design. The magnetic fields for generating a thrust force are generated solely by the primary part 2.

For this purpose, the primary part 2 comprises a primary winding 4, which is also embodied in the form of tooth coils and is mounted on teeth of the primary part 2. A permanent magnet 5 is located in the center of each tooth of the primary part 2. This permanent magnet 5 is in each case arranged along the coil axis of each tooth coil. The motor principle is based on the magnetic "exciter field" of the permanent magnets 5 and the magnetic "armature field" of the energized primary part winding 4, which interact with the toothed secondary part structure and in this way generate the magnetic thrust force of the linear motor.

Due to the fact that no permanent magnets are arranged inside the secondary part 3, the linear motor shown is particularly resilient to environmental influences. As the secondary part 3 is spatially very widely extended, namely along the entire path of travel, it is very much cheaper to produce than a secondary part of a conventional linear motor, in which the permanent magnets are arranged in the secondary part 3 and only the coils of the primary winding 4 in the primary part 2.

In order to be able to achieve a braking effect with the linear motor, in particular in the event of a malfunction, a brake winding 7 is mounted on the secondary part 3. This brake winding consists of individual tooth coils which are pushed over the teeth 6 of the secondary part 3. The tooth coils 7 are connected individually or in series or in multiple groups in series. Also located within this series connection of the tooth coils is a switch 8, which is closed only for braking the transport device 1. During fault-free operation of the transport device 1 the tooth coils of the brake winding 7 are in an open circuit.

The switch 8 is configured such that it has to be actively opened and is thus closed under currentless conditions. This ensures that in the event of a power failure, for example, the brake winding 7 is always short-circuited and that the transport device 1 therefore cannot descend in an uncontrolled manner.

If the transport device 1 is now to be braked with the aid of the brake winding 7, the switch 8 will be closed. Based on the velocity of descent of the transport device 1 and the associated translational motion of the primary part, the permanent magnets 5 induce a voltage in the brake winding 7. In this way, a current is induced in the brake winding 7, which current in turn generates a magnetic field which interacts with the magnetic field of the permanent magnets 5. This interaction is designed such that it counteracts its cause, the velocity of descent of the transport device 1. In other words, the field of the brake winding 7 brakes the transport device 1.

However, the electromagnetic braking effect described is produced naturally only when the transport device 1 is in motion. In order to brake the transport device 1 finally to a standstill, the conveyor system shown also has a buffer element, not shown here, which mechanically brakes the transport device to a complete standstill. This buffer element is arranged in the lower region of the path of travel, i.e. at the lower end of the elevator shaft.

Figure 2:
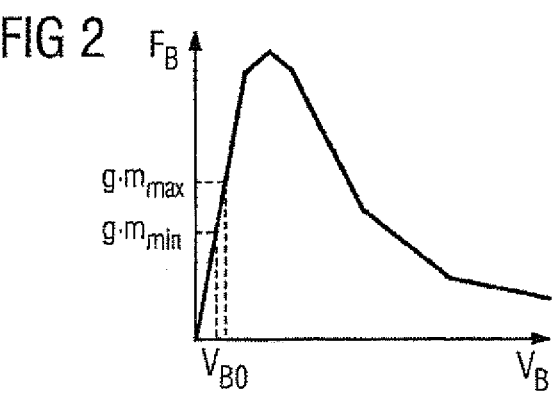
FIG. 2 shows a dependency of the braking force on the velocity of descent of a transport device of a conveyor system according to an embodiment of the invention.

FIG. 2 shows a dependency of the braking force $F_B$ on the velocity of descent $V_B$ of a transport device of a conveyor system according to an embodiment of the invention. Optimizing the layout and wiring of the brake winding for braking means that the required braking force and/or the required characteristic braking curve $F(v)$ can be achieved and adjusted so as always to ensure a safe and slow descent of the transport device at a constant and defined velocity of descent, independently of the load. The layout of the brake winding to achieve the desired velocity of descent is completely independent of the layout of the linear motor to generate the desired thrust force. Consequently, the linear motor can simultaneously be tuned to optimum efficiency and optimized with regard to the braking force required.

FIG. 3 shows a schematic representation of a further elevator system designed according to a further embodiment of the invention. System components corresponding to those from FIG. 1 are consequently labeled with the same reference characters.

The motor principle of the linear motor used and the arrangement thereof correspond to those of FIG. 1. In contrast to FIG. 1, the secondary part 3 is constructed of four serially connected uniform longitudinal modules. Each of these longitudinal modules has a brake winding 7. Furthermore, each of these longitudinal modules is dimensioned such that a desired characteristic braking force-velocity curve is achieved. In this way, a system, once designed, can be used modularly for different shaft lengths, the development of the braking force following the same characteristic force-velocity curve, independently of the length of the shaft.

Each longitudinal module comprises a switch 8 with which the relevant brake winding 7 can be connected to a series circuit consisting of a capacitor 9 and a braking resistor 10. During normal operating mode of the elevator system, the switch 8 is open, so the brake winding 7 is in an open circuit. In the event of a malfunction, the switch 8 connects the brake winding 7 to the series circuit shown. The capacitor 9 is gauged here such that, at a required velocity of descent of the elevator car in the event of a malfunction, it eliminates the inductance of the brake winding 7 exactly. The induced voltage therefore drops completely at the braking resistor 10. The kinetic energy generated by the descent of the transport device 1 is thus all converted to heat in the braking resistor 10.

An alternative wiring of the brake winding 7 is also conceivable in which the braking resistor 10 is switched in parallel with the capacitor 9.

The inventive arrangement of a brake winding on the secondary part will have an effect only in conjunction with the linear motor principle proposed in this application, in which, unlike in conventional linear motors, the permanent magnets for generating the "exciter field" are arranged in the primary part. For only in this way is it possible to achieve the required induced braking effect in the event of a malfunction. If the permanent magnets are arranged in the secondary part as is the case in commonly used linear motors, virtually no braking effect would be produced in the event of a malfunction. The motor principle proposed here therefore has a systemic advantage over conventional linear motors.

The advantages of the braking system according to the invention are noticeable in particular in conveyor systems that operate purely vertically, as here safe braking is especially important, particularly with regard to personal safety. However, conveyor systems which overcome a height difference with a finite gradient can also be designed very advantageously with a braking system of this kind. Thus, for example, it is conceivable and covered by the invention for a mountain railway which transports persons or goods along a path of travel having a steep but finite gradient to be equipped with the drive system and braking system described.

The invention claimed is:

1. A conveyor system, comprising:
   a transport device moveable along a substantially vertical path of travel;
   a linear motor comprising a primary part arranged on the transport device and having a primary winding and at least one permanent magnet, and a secondary part arranged along the path of travel and having in a direction of the path of travel a profile which comprises alternately arranged grooves and teeth;
   a brake winding arranged on the secondary part for generating a braking force by interacting with the permanent magnet to brake the transport device;
   a switch for switching the brake winding to a short circuit or connecting the brake winding with a capacitor; and
   a braking resistor connected to the capacitor,
   wherein the switch is configured such that the brake winding is short-circuited or connected with the capacitor in a currentless state of the conveyor system.

2. The conveyor system of claim 1, wherein the secondary part is of a permanent-magnet-free design.

3. The conveyor system of claim 1, wherein the brake winding is arranged on at least some teeth of the secondary part and configured in the form of single or multiple tooth coils connected in series.

* * * * *